B. C. CALDERWOOD.
LOCKING RING FOR RETAINING PICKING FINGERS.
APPLICATION FILED APR. 30, 1913.

1,093,973.

Patented Apr. 21, 1914.

Witnesses
Andrew Eskil Rylander
Ralph Olney Smithson

Inventor
Benjamin Crabtree Calderwood

UNITED STATES PATENT OFFICE.

BENJAMIN CRABTREE CALDERWOOD, OF VALLEY FALLS, RHODE ISLAND, ASSIGNOR TO PRICE-CAMPBELL COTTON PICKER CORPORATION, OF NEW YORK, N. Y., A CORPORATION OF DELAWARE.

LOCKING-RING FOR RETAINING PICKING-FINGERS.

1,093,973. Specification of Letters Patent. Patented Apr. 21, 1914.

Application filed April 30, 1913. Serial No. 764,517.

*To all whom it may concern:*

Be it known that I, BENJAMIN CRABTREE CALDERWOOD, a citizen of the United States, residing at Valley Falls, in the county of Providence and State of Rhode Island, have invented certain new and useful Improvements in Locking-Rings for Retaining Picking-Fingers, of which the following is a specification.

My invention relates to improvements in locking rings for picking fingers whereby a pin, sliding horizontally in the carriers and under the action of a helical coiled spring, engages with an annular groove cut in the periphery of the locking ring, the radius of both pin and groove being identical, and the center of radius of both annular groove and pin being equidistant from the center of the locking ring.

The objects of my invention are: first, to furnish means which will positively prevent the locking ring from working endwise and resulting in the loss of picking fingers; second, to provide means for speedy removal and replacement of picking fingers when they become broken or damaged, and third, to eliminate the use of wrenches, threaded nuts and locking nuts.

I obtain these objects by the means illustrated in the accompanying drawings, in which—

Figure 1:
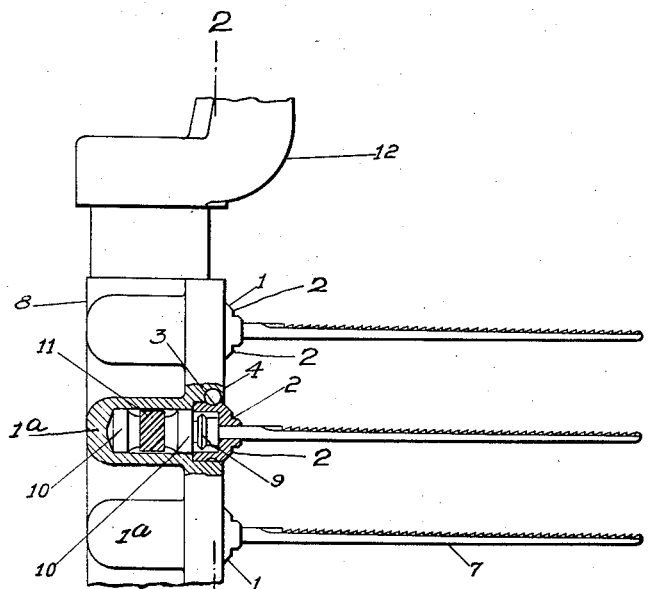
Figure 2:
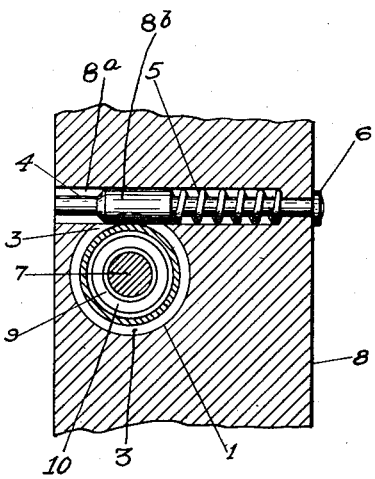
Figure 3:
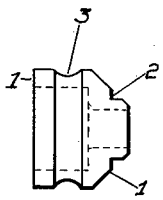
Figure 4:
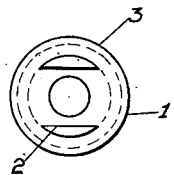

Figure 1 is a side view of the upper part of the carrier, with a portion cut away at the center line of the picking fingers, and shows the locking ring in place in the carrier and its relation to the picking fingers, the combined spiral pinion and socket, and the bushings which act as bearings for the spiral pinion and socket. Fig. 2 is an enlarged section through the carrier on the center line of the sliding pin, at line 2—2 of Fig. 1, and illustrates the manner in which the pin is kept under tension by the helical coiled spring, and of the means provided whereby the pin is prevented from coming out, by the use of a washer riveted to the end of the pin at the outer surface of the carrier. This view also shows the larger diameter of the sliding pin engaging with a groove in the periphery of the locking ring. Fig. 3 is a side view of the locking ring detached, with inside clearance dotted. Fig. 4 is an end view of the locking ring detached, with the groove dotted, and illustrates the cut by which the locking ring is inserted or removed in the carrier.

In the drawings, 1 is the locking ring, 2 its faces for use in grasping the ring, and 3 its groove with the walls of which the horizontally sliding pin 4 engages; 5 is the tension spring for the pin; 6 the washer riveted to the end of pin 4; 7 the picking finger; and 8 the carrier.

9 is an oil-throw ring, formed on the butt end portion of the picker-finger, and which by centrifugal action prevents the lubricating oil from coming out on the picking fingers; 10 are bearings formed on the butt end portion of the picker-finger, one at each side of a gear 11 also formed on the picker finger; and 12 is a cam arm which engages the main translating cam (not shown) and controls the position of the picking finger carriers. Carrier 8 has a recess $8^a$ for reception of the sliding pin, and coiled spring 5 is located between a shoulder $8^b$ of the pin and the bottom of recess $8^a$. Carrier 8 is provided with sockets at an angle to the lengthwise axis of the carrier, each socket forming a bearing for the butt end portion of a picker-finger. The wall of the socket is indicated by $1^a$; bearings 10 on the butt end of the finger and the gear 11 are rotated in the socket by means not shown.

What I claim is,—

1. The combination with a picker-finger carrier having a picker-finger-receiving bearing-socket, of a picker-finger having bearings running in the socket; a locking-ring having a central opening for passage of the picker-finger and covering the entrance to the socket; said ring having a pin-receiving groove; and a pin held in the groove by the carrier.

2. The combination with a picker-finger carrier having a picker-finger-receiving bearing-socket, of a picker-finger having bearings running in the socket; a locking-ring having a central opening for passage of the picker-finger and covering the entrance to the socket; said ring having a pin-receiving groove; a pin held in the groove by the carrier; the carrier having a hole for reception of the pin and the hole having an enlargement for an enlarged portion of the pin; and a coiled spring between an end of the enlarged portion and an end wall of the socket.

In testimony whereof I have hereunto set my hand in the presence of two subscribing witnesses, this 25th day of April, 1913.

BENJAMIN CRABTREE CALDERWOOD.

Witnesses:
G. BLAKE,
WILLIAM J. DODGE.